(12) United States Patent
Sodano

(10) Patent No.: US 9,358,756 B2
(45) Date of Patent: Jun. 7, 2016

(54) INTERLAMINER REINFORCED COMPOSITE STRUCTURES

(76) Inventor: Henry Sodano, Gainesville, FL (US)

(*) Notice: Subject to any disclaimer, the term of this patent is extended or adjusted under 35 U.S.C. 154(b) by 0 days.

(21) Appl. No.: 13/197,985

(22) Filed: Aug. 4, 2011

(65) Prior Publication Data

US 2013/0034724 A1   Feb. 7, 2013

(51) Int. Cl.
| | |
|---|---|
| *B32B 5/02* | (2006.01) |
| *B32B 37/14* | (2006.01) |
| *B32B 7/04* | (2006.01) |
| *B32B 37/02* | (2006.01) |
| *B32B 37/12* | (2006.01) |
| *B82Y 30/00* | (2011.01) |
| *B32B 5/26* | (2006.01) |
| *B32B 37/00* | (2006.01) |
| *B29C 70/02* | (2006.01) |
| *B29K 105/16* | (2006.01) |

(52) U.S. Cl.
CPC ............. *B32B 5/26* (2013.01); *B29C 70/025* (2013.01); *B32B 7/04* (2013.01); *B32B 37/0038* (2013.01); *B82Y 30/00* (2013.01); *B29K 2105/162* (2013.01); *B32B 2250/20* (2013.01); *B32B 2260/046* (2013.01); *B32B 2305/076* (2013.01); *Y10T 156/10* (2015.01); *Y10T 428/25* (2015.01); *Y10T 428/252* (2015.01)

(58) Field of Classification Search
CPC ...... B32B 7/04; B32B 37/0038; B32B 37/02; B32B 37/12; B32B 37/14; B32B 5/26; B32B 2305/076; B32B 2250/20; B32B 2260/046; B29C 70/28; B29C 70/025; B82Y 30/00; B29K 2105/162

USPC .......................................................... 428/325
See application file for complete search history.

(56) References Cited

U.S. PATENT DOCUMENTS

| | | | | |
|---|---|---|---|---|
| 7,601,421 | B2 * | 10/2009 | Khabashesku et al. | 428/297.4 |
| 2007/0003463 | A1 * | 1/2007 | Ajiri | 423/274 |
| 2008/0075954 | A1 | 3/2008 | Wardle et al. | |
| 2008/0166605 | A1 * | 7/2008 | Arps et al. | 429/15 |
| 2009/0176112 | A1 | 7/2009 | Kruckenberg et al. | |
| 2010/0086770 | A1 * | 4/2010 | Roesch | 428/329 |
| 2010/0098931 | A1 * | 4/2010 | Daniel et al. | 428/300.1 |
| 2010/0279569 | A1 * | 11/2010 | Shah et al. | 442/180 |
| 2011/0014473 | A1 * | 1/2011 | Ying et al. | 428/407 |

OTHER PUBLICATIONS

Lee et al., "Silane modification of carbon nanotubes and its effects on the material properties of carbon/CNT/epoxy three-phase composites", Composites Part A: Applied Science and Manufacturing, 42, (5) (2011), pp. 478-483.*

(Continued)

*Primary Examiner* — Cheng Huang
(74) *Attorney, Agent, or Firm* — Saliwanchik, Lloyd & Eisenschenk

(57) ABSTRACT

In an embodiment of the invention, a laminar composite has at least one interlaminar reinforced interface comprising a dispersion of binding-agent-treated low-dimensional nanoparticles with a large aspect ratio fixed between adjacent lamina by residues of the binding agents. In another embodiment of the invention, a method to prepare a laminar composite having reinforced interfaces involves the deposition of binding-agent-treated low-dimensional nanoparticles from a solution or suspension onto the surface or a prepreg sheet, where, optionally, after removal of the liquid that comprises the solution or suspension, sheets of the prepreg are layed-up and cured to form the laminar composite.

15 Claims, 14 Drawing Sheets

(56) References Cited

OTHER PUBLICATIONS

Lin et al., "Increased interface strength in carbon fiber composites through a ZnO nanowire interphase", Advanced Functional Materials, 19, (16) (2009), pp. 2654-2660.*

Garcia, E.J. et al., "Fabrication of composite microstructures by capillarity-driven wetting of aligned carbon nanotubes with polymers," *Nanotechnology*, 2007, pp. 165602 (1-11), vol. 18.

Li, Q., et al., "Drying induced upright sliding and reorganization of carbon nanotube arrays," *Nanotechnology*, 2006, pp. 4533-4536, vol. 17.

Pandey, A. et al., "Enhanced field emission stability and density produced by conical bundles of catalyst-free carbon nanotubes," *Carbon*, 2010, pp. 287-292, vol. 48.

* cited by examiner

INTERLAMINER REINFORCED COMPOSITE STRUCTURES

The subject invention was made with government support under N68335-11-C-0320 awarded by the Department of the Navy. The government has certain rights in this invention.

BACKGROUND OF THE INVENTION

The need for materials that display high specific strength, stiffness, and toughness in excess of those displayed by single phase engineering materials has resulted in the development of composites derived from two or more non-homogeneous materials, where a reinforcing material, generally of greater strength and/or stiffness, is dispersed within a continuous bulk matrix material. Composites allow the properties of the bulk material to be tailored for a specific application. A very useful type of composite is a laminar composite with pluralities of laminae, where each lamina contains unidirectional or woven reinforcing fibers, which are combined to form a composite. The orientation of the fibers can differ from one lamina to another in a stack of laminae. The reinforcement is predominately in the direction of the reinforcing fibers in the laminae, in-plane, with little or no reinforcement to the common perpendicular to the fibers, the thickness of the laminar composite. The ultimate performance of laminar composite materials is heavily influenced by the strength and toughness of the interlaminar region where adjacent laminae intimately contact.

Enhancement of the interlaminar strength in composite materials has been achieved by four primary methods: interleaves, where a thin interlayer of an adhesive, which can be a second composite material, is placed at the interface between laminae; nanocomposite matrices, where the matrix material is further reinforced by a second reinforcing nanomaterial; Z-pinning, where laminae are connected by extending fibers through the thickness by weaving, knitting, braiding or stitching; and fiber whiskerization, where the reinforcing fibers are decorated with "whiskers" of a like or dissimilar reinforcing material. Limitations to employing these technologies have not facilitated their widespread adoption in commercial composites. For example: interleave methods reduce the composite's in-plane strength; nanocomposite matrices require costly resin transfer molding (RTM) processes and complex dispersion techniques; Z-pinning requires expensive tooling and leads to damage of the reinforcing fibers and can form defects that initiate composite failure; and fiber whiskerization remains costly and poses significant manufacturing challenges.

Hence, there remains a need for interlaminar reinforcement that maintains the laminar composite's in-plane properties yet is low cost, environmentally benign, and compatible with commercial prepreg processing. Furthermore, the method of preparing the laminar composite should be readily adaptable to a commercial production scale without the requirement of advanced tooling or resin transfer processes.

BRIEF SUMMARY OF THE INVENTION

Embodiments of the invention are directed to laminar composites having interlaminar reinforced interfaces that comprise a dispersion of binding-agent-treated low-dimensional nanoparticles fixed between and to the adjacent laminae by the binding agent and matrix material. The low-dimensional nanoparticles can be "one-dimensional nanoparticles", for example, nanowires, nanofibers, nanotubes, nanoneedles, or nanobelts, which are particles with an aspect ratio (length to diameter ratio) of about three or greater and lengths of about 300 nm to about 10 µm. The low-dimensional nanoparticles can be "two-dimensional nanoparticles", for example, nanoplates or nanodiscs, where the aspect ratio (cross-section to thickness) is about three or greater and the cross-section is about 300 nm to about 10 µm. In an embodiment of the invention, the low-dimensional nanoparticles can be a ceramic or glass of a metal oxide, metal calcogenide, metal nitride, metal phosphide, metal arsenide, or metal carbide. In another embodiment of the invention, the low-dimensional nanoparticles can be a metal or metal alloy. In another embodiment of the invention, the low-dimensional nanoparticles can be carbon species, for example carbon nanotubes, carbon nanofibers or graphene.

In an embodiment of the invention, the binding agent can be a feature of the low-dimensional nanoparticles, such as a surface texture, for mechanical interlocking within the lamina's matrix upon curing of the resin of the laminae. In another embodiment of the invention, the binding agent is a molecule that has one or more functionalities that bind to a low-dimensional nanoparticle and one or more functionalities that bind to the lamina's matrix upon curing. In an embodiment of the invention, the binding agent comprises a molecule that is part of the matrix resin or a molecule that is added to the surface of the nanowire to induce binding between the matrix and the low dimensional nanoparticle upon curing of the resin to form the composite.

Another embodiment of the invention is directed to a method of forming a laminar composite with a reinforced interlaminar interface, as above, where a solution or suspension of low-dimensional nanoparticles in a liquid or aerosol is deposited on one or both surfaces of the prepreg sheets to form a surface having the low-dimensional nanoparticles where a binding agent is present at the surface of the lamina with the nanoparticles. The low-dimensional nanoparticles can be depositing by spray coating, dip coating, or roller coating. If needed, the liquid can be removed from the surface, for example, by heating the surface, or passing a gas through or evacuating a volume situated adjacent to the surface. After laying-up the prepreg sheets, the sheets are laminated under pressure to form an intimate interface between adjacent prepreg sheets. Curing the resin of the prepreg sheet forms the laminar composite where the interfaces between laminae are reinforced by the low-dimensional nanoparticles secured by the binding agent. The binding agent can be a molecule with functionality to bind to the low-dimensional nanoparticles and functionality to bond with the resin, a resin where a portion has a functionality to bind to the low-dimensional nanoparticles, or a feature of the low-dimensional nanoparticles' surface that promotes mechanical interlocking with the resin upon cure.

DETAILED DESCRIPTION OF THE INVENTION

Figure 1:
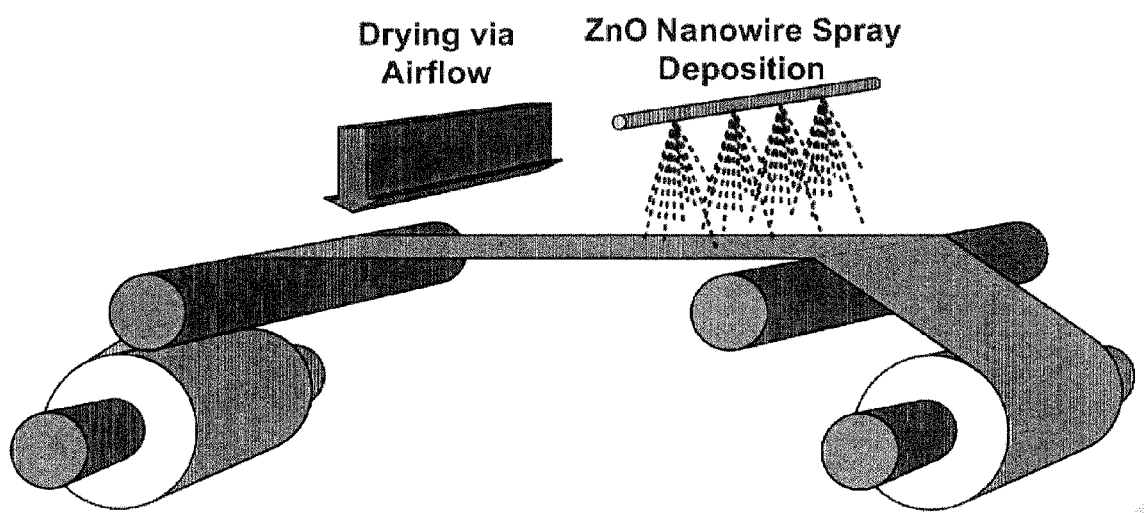
FIG. 1 shows a schematic drawing of the roll-to-roll processing system to deposit binding-agent-treated nanowires from suspension or solution on a prepreg sheet, according to an embodiment of the invention.

Embodiments of the invention are directed to interlaminar reinforced laminar composites that include a dispersion of nanowires, or other low-dimensional nanoparticles, at the interface of at least two adjacent laminae of the laminar composite where one or more binding agents binds the nanowires to the resin of adjacent laminae at their interface. The nanowires improve the interlaminar strength while maintaining the composite's in-plane properties. In embodiments of the invention, laminar composites having interlaminar reinforcement are formed by the deposition of nanowires on a lamina surface. In embodiments of the invention, the nanowires have been treated with a binding agent that is chosen to bind to the nanowire surface with the polymer matrix of the composite during cure of the thermosetting resin when forming the continuous matrix of the composite. Treatment by the binding agent results in binding that is chemical or physical in nature. For example, binding can be by covalent, ionic, van der Waals bonding, electrostatic association, mechanical interlocking by a textured surface of the nanowire and/or the resin of the matrix, or any combination thereof. Where a chemical binding agent is used, the agent can be used to treat the nanowires before their introduction to the resin, can be in or on the resin, or can be a portion of the resin itself. Treating can be contacting, entrapping, associating, or bonding. The deposition can be carried out using commercially available prepreg sheets, where the nanowires are deposited from a suspension on a surface of the prepreg sheets. Alternatively, or additionally, in an embodiment of the invention, the binding-agent-treated nanowires can be blended into the thermosetting resin prior to impregnation or resin transfer molding (RTM) of the reinforcing fibers. Laminar composites, according to embodiments of the invention, can be used to form structures having applications in, for example, the aerospace, automotive, marine, wind energy systems, furniture, telecommunications, sports equipment, railroad, ship building, motor homes, sport boats, trucks, trailers, shipping containers, residential homes and other architecture, oil and gas exploration pipes, and space systems.

In exemplary embodiments of the invention, the nanowires are zinc oxide (ZnO) nanowires that have been treated with an amino acid, for example, glycine, for deposition on the lamina surface of an epoxy resin carbon fiber comprising prepreg sheet by spray coating. The treatment is low cost, environmentally benign, compatible with prepreg processing, scalable to typical commercial production scales, and does not require advanced tooling or resin transfer processes (RTP).

Although embodiments of the invention are illustrated using ZnO nanowires that are treated with amino acids and an epoxy resin, other "low-dimensional" nanoparticles, other metal oxides, other binding agents, and other thermosetting or photosetting resins can be used. Although all particles are necessarily three-dimensional in structure, the nanoparticles employed, according to embodiments of the invention, have one or two dimensions that are significantly less than the other dimension(s), such that the predominate influence as a reinforcing agent is derived from the larger dimension(s), which define the dimensionality of the nanoparticles. The nanoparticles can, and often have, one dimension that is of micrometer dimensions, although on average, less than about 10 µm. In embodiments of the invention, nanowires, or, alternatively or additionally, any "one-dimensional" nanostructure, such as nanotubes, nanorods, nanoneedles, or nanobelts; or other high aspect "two-dimensional" nanostructures, such as nanoplates or nanodiscs, can be employed. The term nanowire is generally used herein, but one should appreciate that other high aspect ratio shapes are interchangeable for purposes of embodiments of the invention.

In embodiments of the invention, the nanowire can comprise: any metal oxide, such as, ZnO, $VO_2$, $V_2O_5$, $RuO_2$, $MoO_2$, $MoO_3$, $Fe_3O_4$, $In_2O_3$, $SnO_2$, $Fe_2O_3$, $Ga_2O_3$, CdO, $WO_3$, CuO, $TiO_2$, PbO, $ZrO_2$, $Nb_2O_5$, $Ta_2O_5$, $IrO_2$, $Cu_2O$, $Al_2O_3$, or any binary, tertiary or perovskite metal oxides; any metal nitride, such as GaN, BN, AlN, InN, $Si_3N_4$ or $Si_2N_2O$; any metal calcogenide such as, CdS, CdSe, CdTe, PbS, PbSe, CuS, CuSe, ZnS, ZnSe, $NbS_2$, or $NbSe_2$; any metal phosphide or arsenide, such as, GaP, InP, or GaAs; any metal carbide, such as SiC, BC, or WC; any metal boride, such as $AlB_{12}$, $MgB_2$, or $CeB_6$; or any metal silicide, such as FeSi, $Ni_2Si$, $Ni_3Si$, $CrSi_2$, MnSi, or CoSi. The nanowire can be in the form of a ceramic or a glass. In other embodiments of the invention, the nanowire can be a metal or metal alloy, for example Fe, Cu, Ni, Co, or Ag. In other embodiments of the invention, the nanowire can be in the form of carbon, for example a carbon nanotube, carbon nanofiber, graphene, or graphite nanoplatelets. The nanowires should have a length of about 300 nm to about 10,000 nm or more, for example, where the nanowires have an average length of, for example, 500 nm, 1,000 nm, 2,000 nm, 3,000 nm, 5,000 nm, or 10,000 nm. The aspect ratio, for example, the length to diameter ratios of the nanowires, or the cross-section to thickness ratio of a nanoplate, should be in excess of about 3 to about 50 or more, for example, 5 to 15.

In embodiments of the invention, the matrix of the composite can be derived from any thermosetting resin, photosetting resin, thermoplastic or photocuring thermoplastic with any reinforcing fiber or cloth. In addition to the epoxy resins employed in the exemplary embodiments, the matrix of the composite can be, for example, ester, urethane, urea, amide, imide, phenolic, vinylester, PEEK, PEI, PES, polycarbonates, bismaleimide, or polyolefin resins. The reinforcing fibers can be, for example, quartz fibers, SiC Fibers, alumina fibers, metal fibers and wires, graphite fibers, carbon fibers, boron fibers, aramid fibers, ultra-high molecular weight polyethylene fibers, poly(benzobisoxazole) fibers, polyimide fibers, glass fibers, and/or multiphase fibers.

According to embodiments of the invention, the binding agents are defined as any chemical or mechanical interaction which acts to create binding between the nanowire and matrix. The binding agent can comprise a chemical having at least one first functional group with the potential to bind to the nanowire and at least one second functional group with the potential to be incorporated into the matrix upon curing of the resin, or it can even be the resin that has functional groups that can bond or associate with the nanowire surface. The first and second functional groups can be the same or different. For example, the amino acid, glycine, used as the exemplary binding agent with the ZnO nanowire and an epoxy resin matrix contains a carboxylic acid functional group that is capable of binding as a Zn carboxylate to the ZnO nanowire surface and an amine functional group that is capable of reacting with an epoxide group of the epoxy resin. Other binding agents can be a molecule that includes two or more functionalities, one or more functional groups that bind to the nanowire and one or more functional groups that bind with a chosen resin, or a resin or portion of a resin that has functional groups that can bind to the nanowire. For example, in one embodiment of the invention, the binding agent can be a monomer, comonomer, or polymer of the resin. Where the binding agent is a separate molecular chemical agent, the molecule can be a small molecule or a large molecule, for example, an oligomer or a polymer. In addition to carboxylic acids, other functional groups that can bind to the metal oxide nanowires include, for example, a sulfonic acid, sulfinic acid, silanes, titanates, amines, a chelating ligand, or other functional groups capable of associating with a metal ion or of undergoing an acid-base reaction with the metal oxide, or its equivalent. In addition to the amino group that can react with the exemplary epoxy resin, functionalities that can undergo reaction with a functional group of a resin include, for example, the functional groups hydroxy, thiol, carboxylic acid, ester, anhydride, vinyl, epoxy, isocyanate, functional silane, or any other group that is chosen to be compatible with the curing of the selected resin. The relative quantity of the binding agent to the nanowires is such that at least one binding site on average up to all effective binding sites on the surface of the nanowire can be bonded with the binding agent. Depending on the binding agent and the nanowire, an excess of the binding agent can be used, or the amount of binding agent can be controlled to avoid any potential structural damage to the nanowire, such as where an excess of an acidic binding agent would effectively dissolve a metal oxide upon its decomposition. The weight ratio of binding agent to nanowire can be, for example, about 0.1 to about 1.0, for example, about 0.7 to about 1.0.

In other embodiments of the invention, the binding agent can be a portion of the resin or an additive to the resin, where the portion or the additive has at least one functionality that has a binding affinity to the nanowire. In another embodiment of the invention, the surface of the nanowire can have a texture or porosity that acts as a physical binding agent. In this case, the texture of the nanowire surface permits the matrix to interlock with nanowire or simply to have increased surface area through which a load on the composite is transferred. The texture can be inherent to the nanowire as synthesized or mechanically or chemically etched into the surface of the nanowire.

In embodiments of the invention, nanowires are included in the laminar composites by: deposition of the nanowires from a suspension or solution on a lamina's surface; removal of the liquid, if needed or desired; and contacting, generally by pressing or compressing, a second lamina onto the nanowire-comprising surface prior to curing the resin to form the composite. The liquid can be any liquid in which the nanowires can be suspended or dissolved that is non-reactive with the nanowires or the functionalities for binding with the resin on the binding agent, when the nanowires are treated with the binding agent prior to or during forming the suspension or solution. The liquid can be non-reactive with the resin or the liquid can be reactive with the resin, as long as the properties of the resulting cured matrix are not significantly degraded, are the same, or where the properties of the matrix are enhanced by the reactive liquid relative to that of the properties of the matrix absent the liquid. The liquid can be a volatile liquid that is removed, partially or completely, prior to joining lamina surfaces during a lay-up procedure where adjacent laminae are positioned and subsequently pressed together. In general, the concentration of nanowires suspended in the liquid is low, for example about 0.1 to about 50 g of nanowires per liter of suspension or solution. In embodiments of the invention, the nanowire suspension or solution is deposited on the lamina surface by, for example, any spray coating, dip coating, or roller coating technique. The deposition can be carried out in a single step or pass, or in multiple steps or passes.

According to an embodiment of the invention, the deposition of the nanowires on the surface of a prepreg sheet, for example, a commercially available prepreg, can be carried out using, for example, an unwind and rewind web handling system. As illustrated in FIG. 1, a prepreg sheet can be unwound from one rolled cylinder at a controlled line speed, passed under one or more air atomizer nozzles to spray-deposit the binding-agent-treated nanowires on the prepreg's surface, optionally passed under a dryer, and rewound about a second cylinder for storage until the lay-up step of a composite formation process. The optional dryer is shown in FIG. 1 as a series of air nozzles for a downward air flow, but the dryer can include or substitute a heating or evacuating device to remove the liquid used to suspend or disperse the nanowires. The binding agent can be fixed to the nanowires in the suspension or solution, can be deposited on the prepreg sheet separately, either before, during, or after the deposition of the nanowires; or can be infused within, or can be a portion of the prepreg sheet. A single deposition of the nanowires or multiple depositions of the nanowires on a prepreg sheet can be performed, where multiple depositions can use a single sprayer or multiple sprayers in a single pass of the prepreg sheet or with multiple passes of the prepreg sheet.

Properties in addition to interlaminar strength can be enhanced by the incorporation of nanowires into the laminar composites. For example, ZnO has a strong absorbance in the ultraviolet regions of the electromagnetic spectrum, which can improve the environmental resistance of the matrix polymer of the composite, as photodegradation is common to epoxy and other resin comprising composites. Other advantages, which are possibly realized by the inclusion of the interlaminar reinforcing nanowires, include improvement of in-plane strength and the ability to use the nanowires for sensing, actuating, and damping properties of a laminar composite. For example, ZnO is piezoelectric material, which can be used for structural health monitoring to significantly reduce maintenance costs of composites while improving their safety through state awareness. Furthermore, the reinforcing ZnO nanowires are significantly larger than the 2-20 nm size particles that are used, for example, in suntan lotions, so no serious heath concerns are raised by the presence of this nanoscale material during composite production.

Materials and Methods

Preparation of the ZnO Nanowires and Composites

Figure 2:
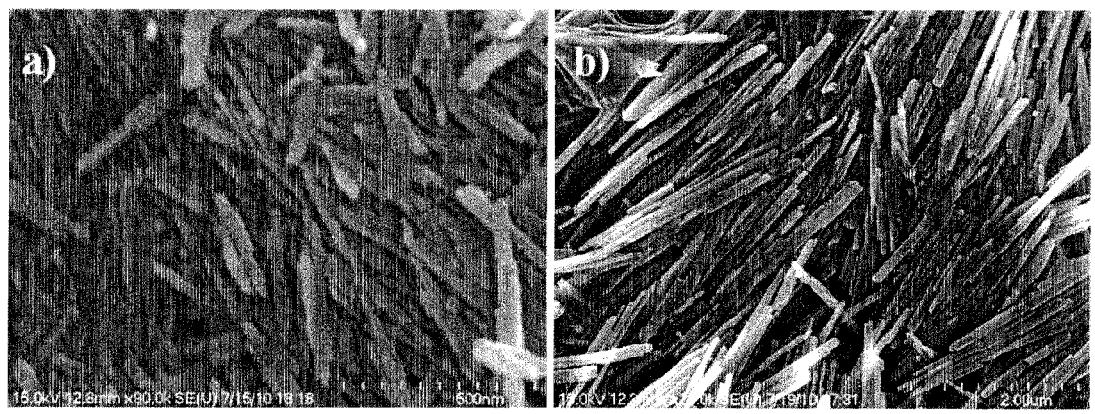
FIG. 2 shows scanning electron microscope (SEM) images of solution grown a) 500 nm length and b) 1 µm length ZnO nanowires used for reinforcing laminar composites according to embodiments of the invention.

ZnO nanowires were prepared through a reaction of zinc acetate and potassium hydroxide in methanol. During growth, the nanoparticles displayed a length increase at a considerably faster rate than the width increase. The rate of growth was controlled by varying the reaction time, temperature, and pressure. Nanowires with lengths of 500 nm and 1 to 2 μm, were prepared. Nanowires were isolated by centrifugation followed by subsequent washings with methanol and mill-q water. SEM images are shown in FIG. 2 of (a) the 500 nm long nanowires and (b) the 1 μm long nanowires that were produced. Following growth of the nanowires, 1 g of ZnO was suspended in 100 ml of ultrapure water with 1 g of glycine and refluxed for 24 hours. Following reflux the nanowires were washed several times with mill-q water followed by methanol through centrifugation.

Figure 3:
FIG. 3 shows photographic images of CYCOM® 977-2 carbon fiber prepreg laminae coated with glycine treated ZnO in methanol after increasing numbers of passes under a spray coater, as indicated, according to an embodiment of the invention.

The binding-agent-treated ZnO nanowires were deposited on the prepreg by a spray coating process. The nanowires were dispersed in a methanol solution at a weight ratio of 100:1 (MeOH:ZnO). Dispersion was achieved through vortex mixing followed by bath sonication. The solution was loaded into an airbrush and uniformly sprayed onto the surface of the prepreg sheets such that no droplets formed on the sprayed surface. Composite specimens were made with varying volume fractions of ZnO nanowires by holding the solution concentration constant and controlling the number of sprayed passes over the prepreg sheets. Alternatively, a single pass with the appropriate weight fraction of nanowires would allow deposition with a single spray pass. FIG. 3 shows surfaces of several prepreg sheets with increasing volume fractions of ZnO nanowires. For a composite lay-up, only one side of the prepreg was coated. The prepreg was CYCOM® 977-2 toughened resin with 35% resin content by weight and with IMS60 carbon fibers from Toho Tenax Co. Ltd. having a 136 g/m² fiber weight.

The laminar composites were formed using a unidirectional layup and were vacuum bagged and pressed at 177° C. according to a cure cycle specified by the manufacturer for CYCOM® 977-2. Short beam shear specimens were cut using a CNC diamond saw, according to the dimensional constraints outlined in ASTM D-2344. In-plane tensile specimens were cut to the dimensional constraints outlined in ASTM D-3039. The short beam specimens consisted of 10 laminae and had a nominal thickness of 1 mm, while the tensile specimens consisted of 5 laminae with a nominal thickness of 0.5 mm.

Figure 4:
FIG. 4 shows an SEM image of the cross section of a laminar composite from CYCOM® 977-2, according to an embodiment of the invention, showing the ZnO nanowire comprising interlaminar regions at approximately 100 µm intervals that is approximately the thickness of a lamina of the laminar composite.
Figure 5:
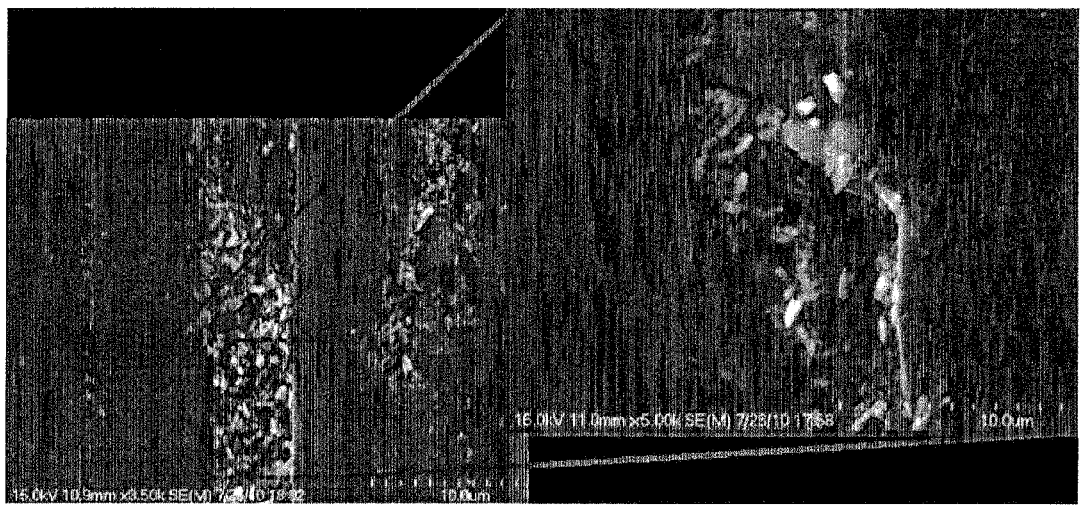
FIG. 5 is a magnification of the interlaminar region shown in FIG. 4 for a laminar composite according to an embodiment of the invention.

Cross sections of the laminar composites were analyzed using SEM to view the ZnO nanowire dispersion in the interlaminar region. FIG. 4 shows the cross section of a composite cut along the fiber axis and polished. The image displays periodic layers of ZnO nanowires spaced at about 100 μm, which is the approximate lamina thickness. The images show that the ZnO nanowire interfaces do not significantly increase interlaminar spacing and do not result in a significant reduction in fiber volume fraction, allowing the maintenance of in-plane properties. FIG. 5 shows a magnified image of the reinforced interlaminar region displaying the dispersed ZnO nanowires.

Characterization of the Reinforced Composites

Figure 6:
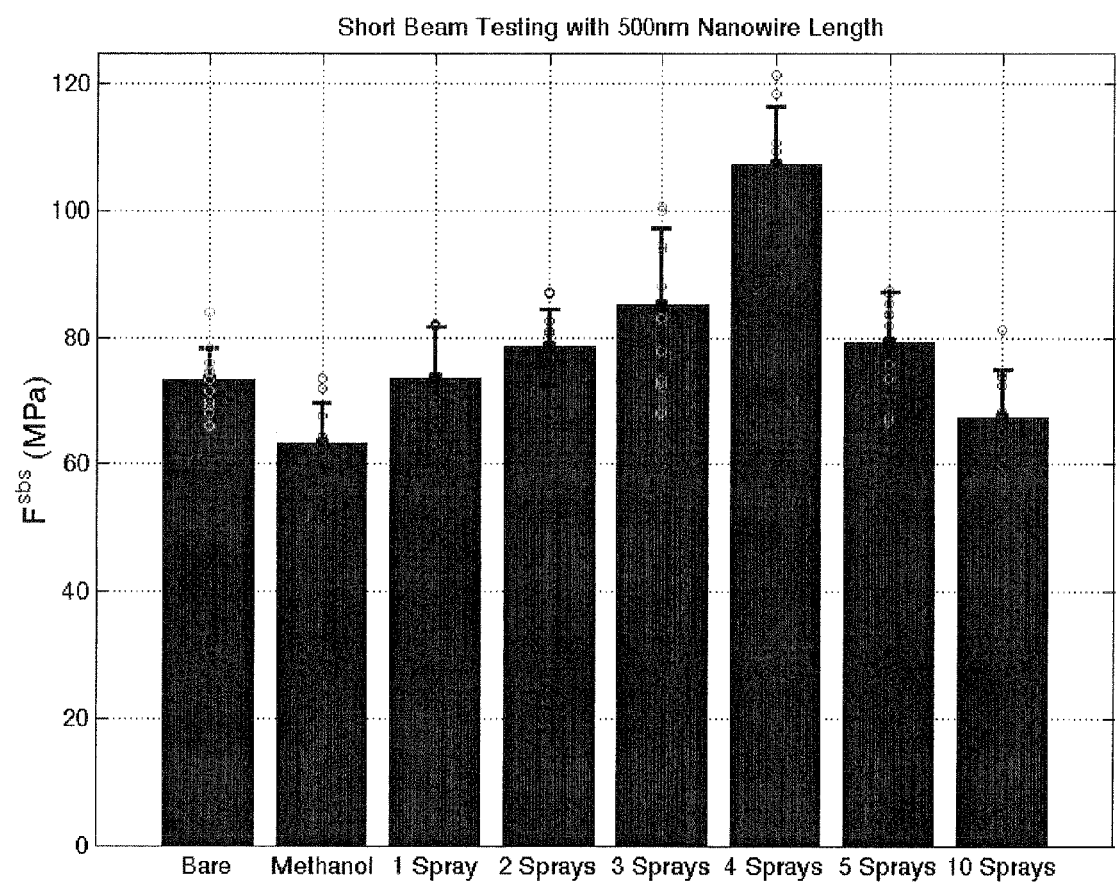
FIG. 6 is a bar graph of the short beam shear strength for laminar composites from CYCOM® 977-2, according to embodiments of the invention, prepared from prepreg sheets that were spray coated with 500 nm long binding-agent-treated ZnO nanowires for the indicated number of passes over one of each sheet's surfaces.
Figure 7:
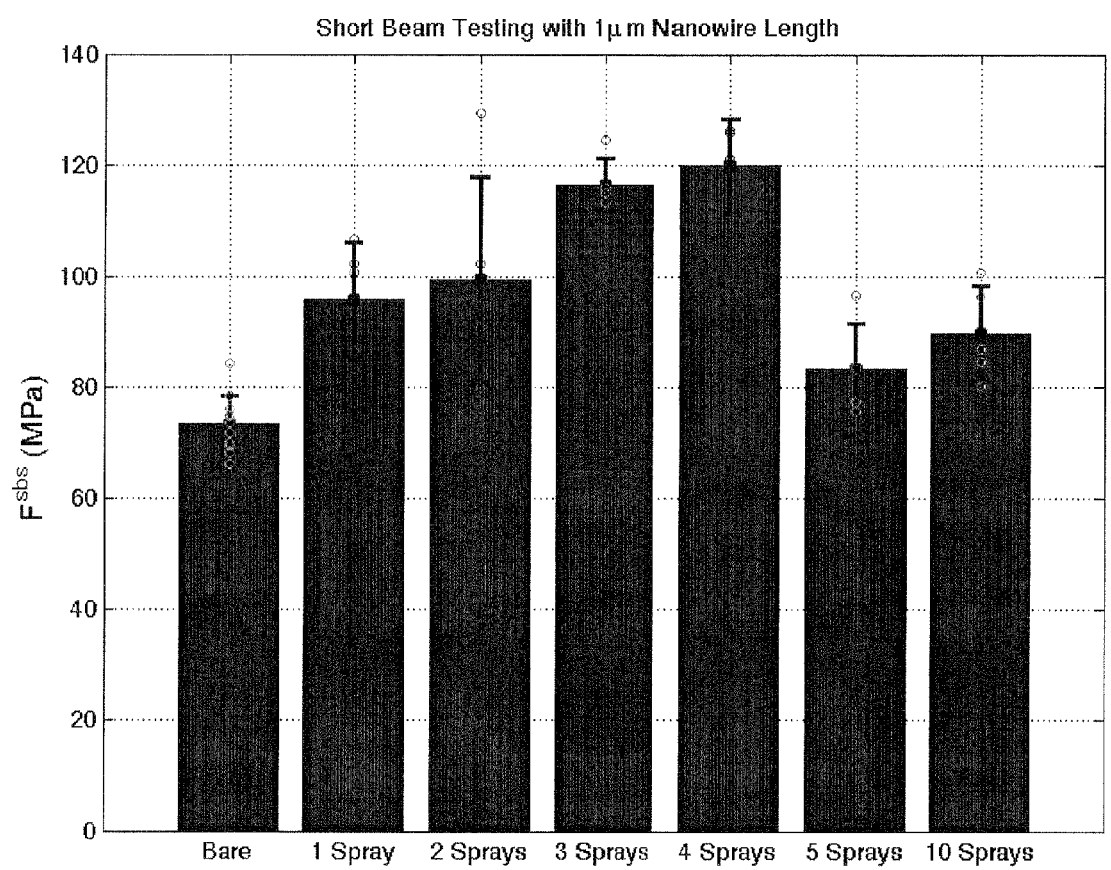
FIG. 7 is a bar graph of the short beam shear strength for laminar composites from CYCOM® 977-2, according to embodiments of the invention, prepared from prepreg sheets that were spray coated with 1 µm long binding-agent-treated ZnO nanowires for the indicated number of passes over one of each sheet's surfaces.

Short beam shear and tensile testing were performed in accordance with ASTM Standards D-2344 and D-3039, respectively. Short beam testing was carried out using samples where 0-5 and 10 sprays of 500 nm or 1 μm long nanowires. Tensile testing was carried out using samples having 0-4 sprays of 500 nm long nanowires. The results of the short beam testing for samples with 500 nm long binding-agent-treated nanowires are shown in FIG. 6 and results for samples having 1 μm long binding-agent-treated nanowires are shown in FIG. 7. The deposited ZnO nanowires reinforce the interlaminar region of the composite with optimal levels of deposition appearing to have been achieved with 4 sprays for either ZnO nanowire length, which indicates the optimal volume fraction of the nanowires in the interlaminar region. The short beam strength of the laminar composites with interlaminar reinforcement by 500 nm nanowires displays an increase of 46.5% relative to a composite without deposition of the interlaminar reinforcement, while the longer 1 μm nanowires increase the strength by 63.4%. FIG. 6, also indicates that the short beam strength of the composite, prepared from lamina spayed with methanol with no binding-agent-treated nanowires, suffers a 13.6% decrease in strength relative to a composite without methanol treatment. This suggests that a solvent that is incapable of reaction with an epoxy ring, and/or where the solvent is more completely removed from the lamina prior to curing of the resin, could further increase the strength of the interlaminar region in excess of that observed in these experiments.

Figure 8:
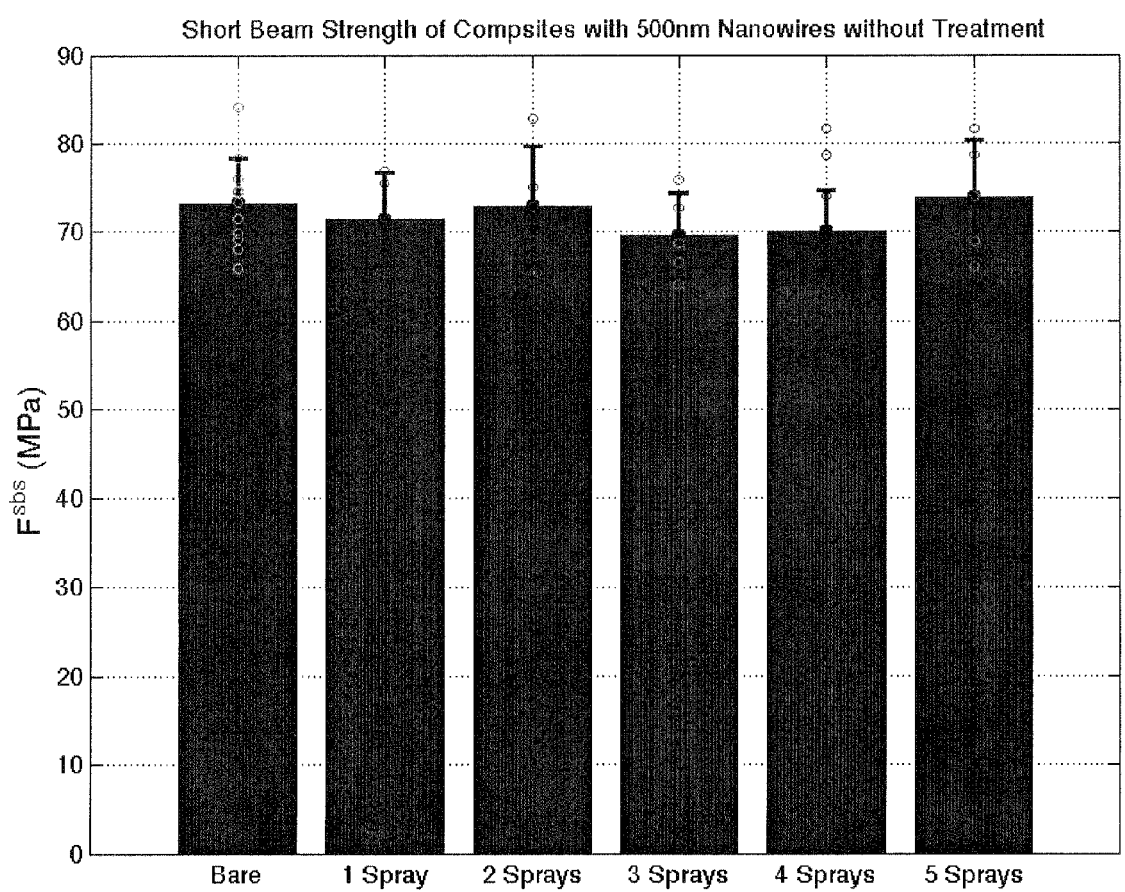
FIG. 8 is a bar graph of the short beam shear strength for laminar composites from CYCOM® 977-2 prepared from prepreg sheets that were spray coated with 500 nm long ZnO nanowires without a binding agent for the indicated number of passes over the sheet's surface.

The importance of the binding agent was demonstrated by short beam testing performed on composites incorporating 500 nm ZnO nanowires that were not treated with the binding agent glycine. FIG. 8 shows results of short beam tests for laminar composites formed from prepreg sheets that had 0-5 sprays of untreated ZnO nanowires. As can be seen in FIG. 8, no improvement in strength was observed using untreated ZnO nanowires.

Figure 9:
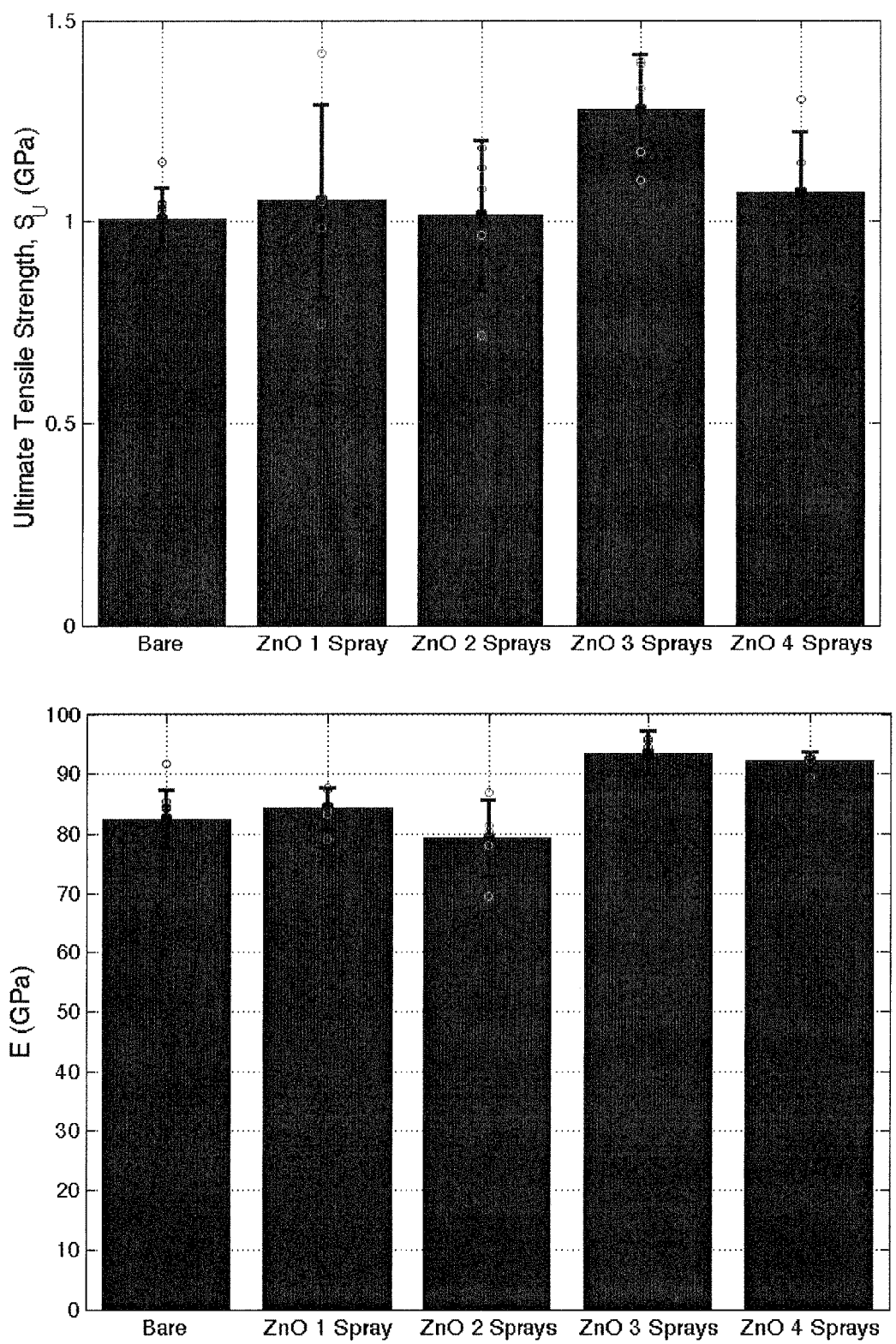
FIG. 9 shows bar graphs of the in-plane tensile strength (top) and modulus (bottom) for glycine treated ZnO nanowire reinforced laminar composites from CYCOM® 977-2, according to an embodiment of the invention, where the prepreg sheets were coated by the indicated number of passes over one of the prepreg sheets' surface.
Figure 10:
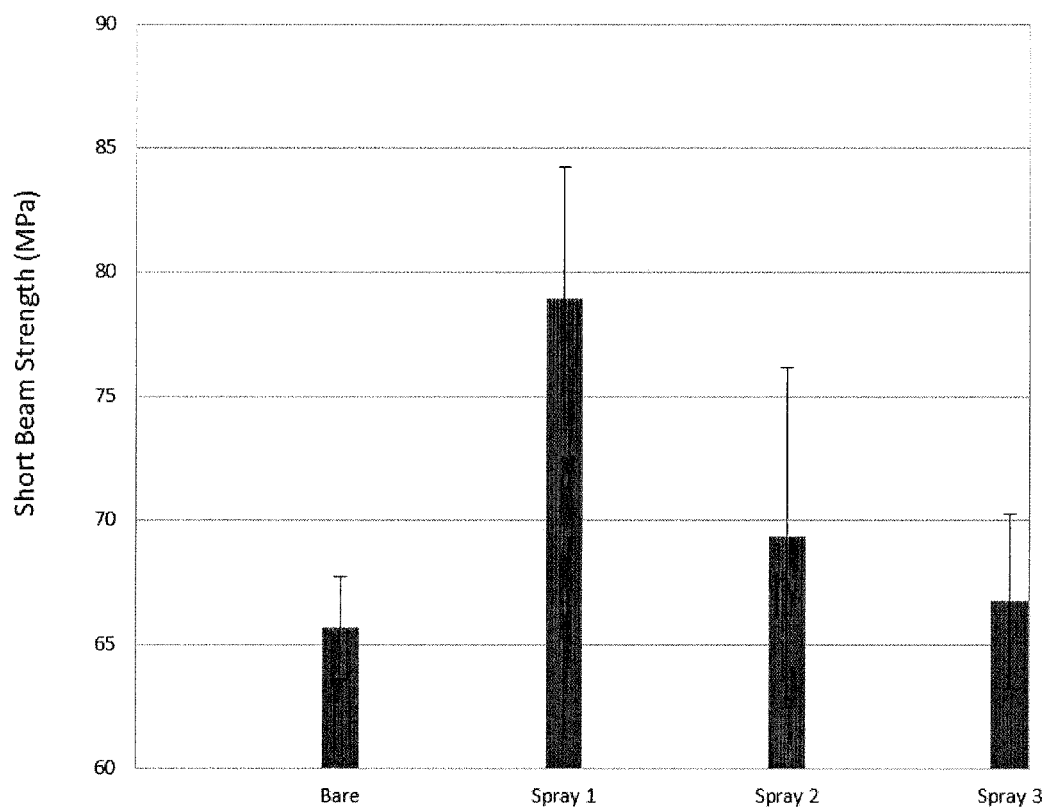
FIG. 10 is a bar graph of the short beam shear strength for laminar composites from S2-E773 glass-epoxy prepreg sheets, according to embodiments of the invention, prepared from prepreg sheets that were spray coated with 300 nm long binding-agent-treated ZnO nanowires with a 200 psi cure pressure and 260° F. cure temperature for the indicated number of passes over the sheet's surface.
Figure 11:
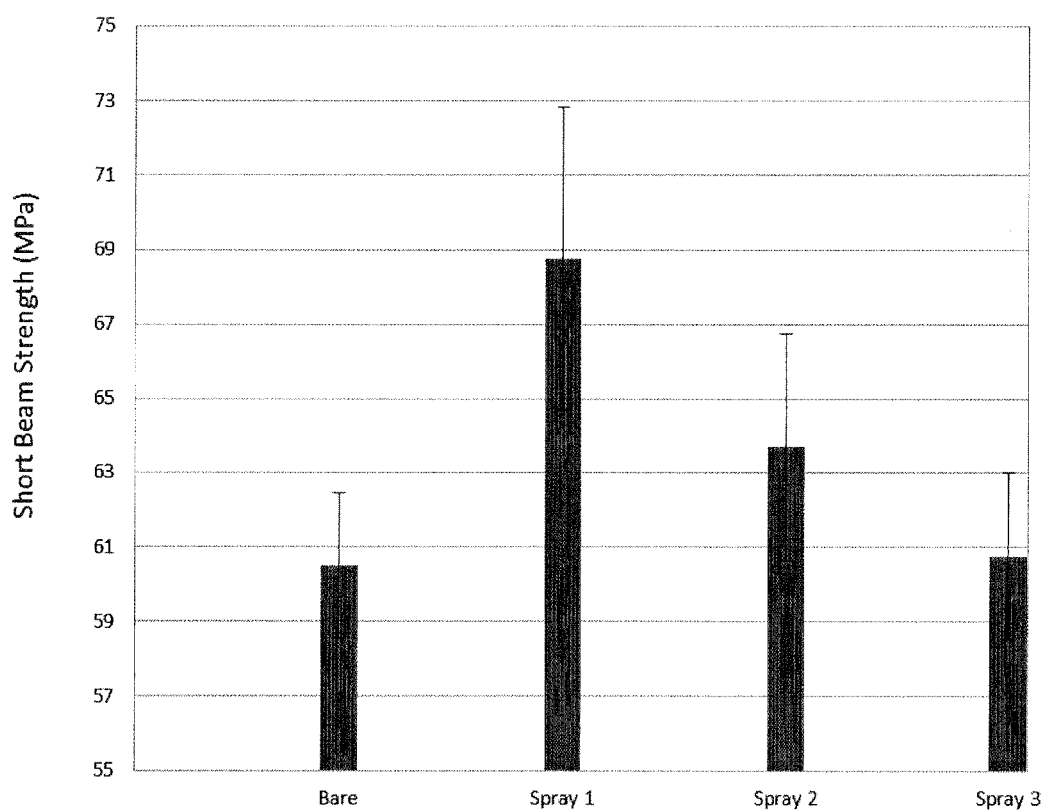
FIG. 11 is a bar graph of the short beam shear strength for laminar composites from S2-E773, according to embodiments of the invention, prepared from prepreg sheets that were spray coated with 300 nm long binding-agent-treated ZnO nanowires with a 100 psi cure pressure and 260° F. cure temperature for the indicated number of passes over the sheet's surface.
Figure 12:
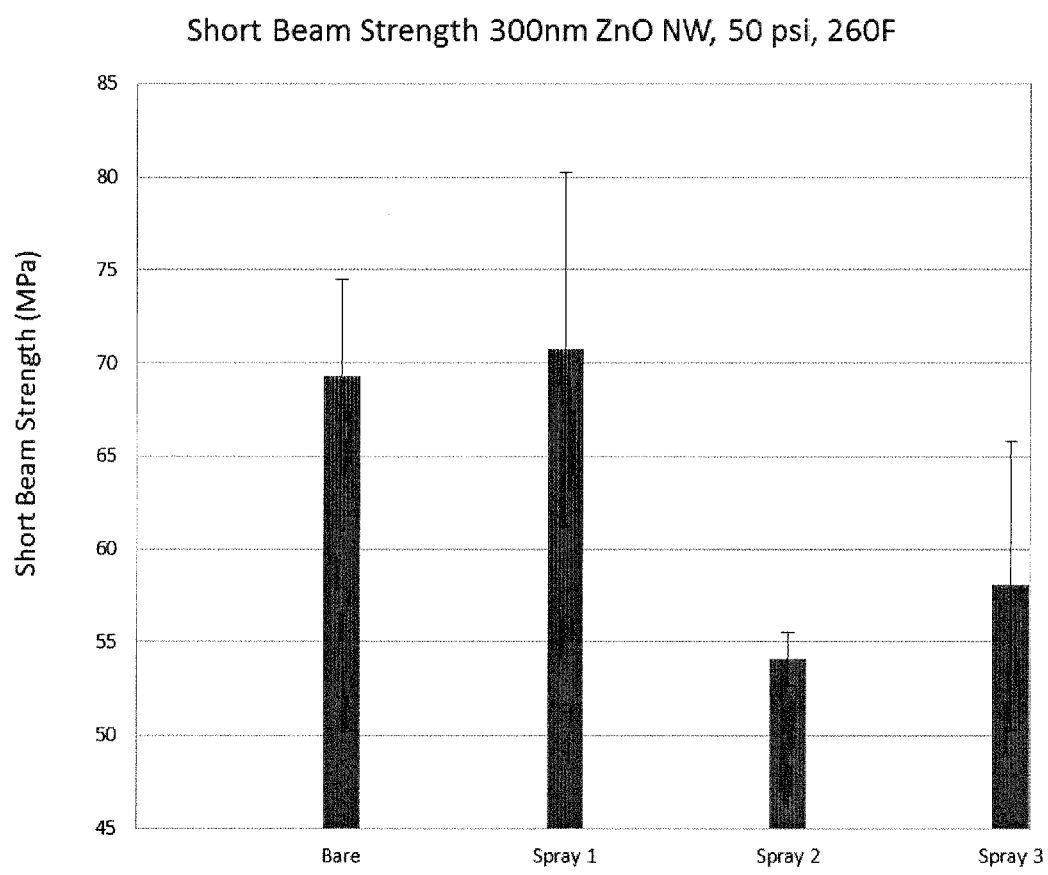
FIG. 12 is a bar graph of the short beam shear strength for laminar composites from S2-E773, according to embodiments of the invention, prepared from prepreg sheets that were spray coated with 300 nm long binding-agent-treated ZnO nanowires with a 50 psi cure pressure and 260° F. cure temperature for the indicated number of passes over the sheet's surface.
Figure 13:
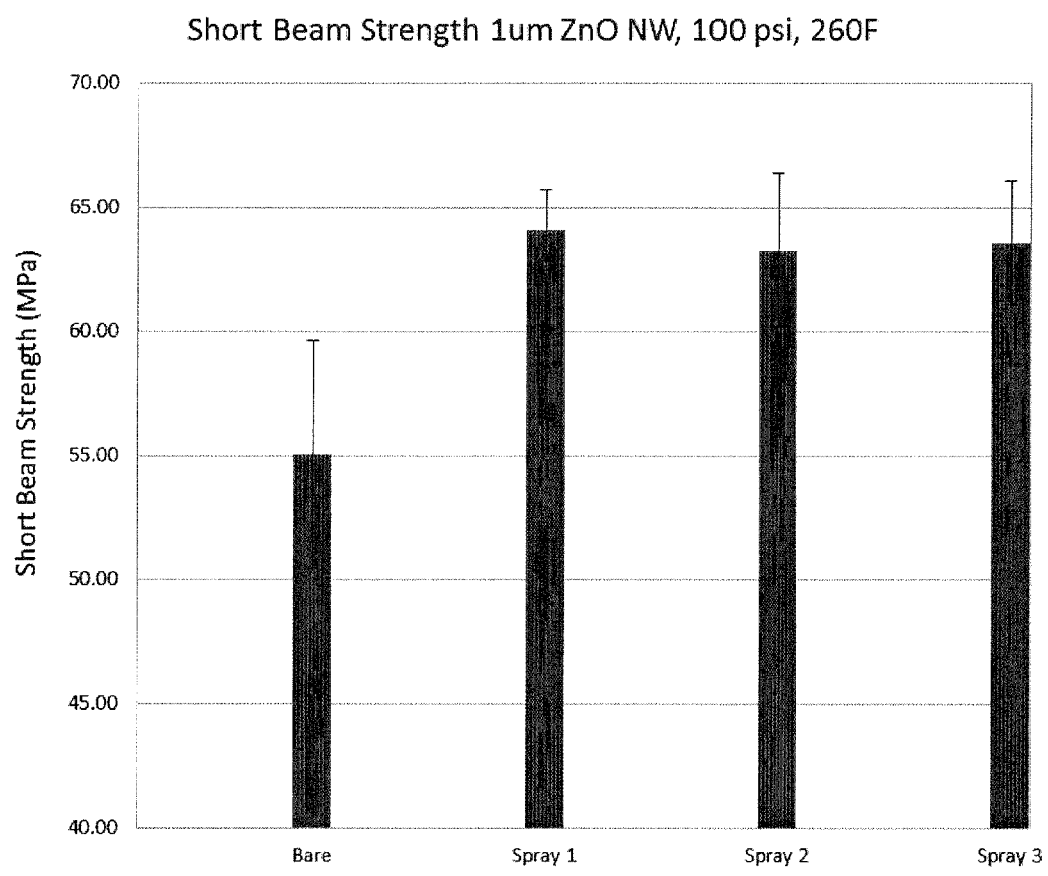
FIG. 13 is a bar graph of the short beam shear strength for laminar composites from S2-E773, according to embodiments of the invention, prepared from prepreg sheets that were spray coated with 1 µm long binding-agent-treated ZnO nanowires with a 100 psi cure pressure and 260° F. cure temperature for the indicated number of passes over the sheet's surface.
Figure 14:
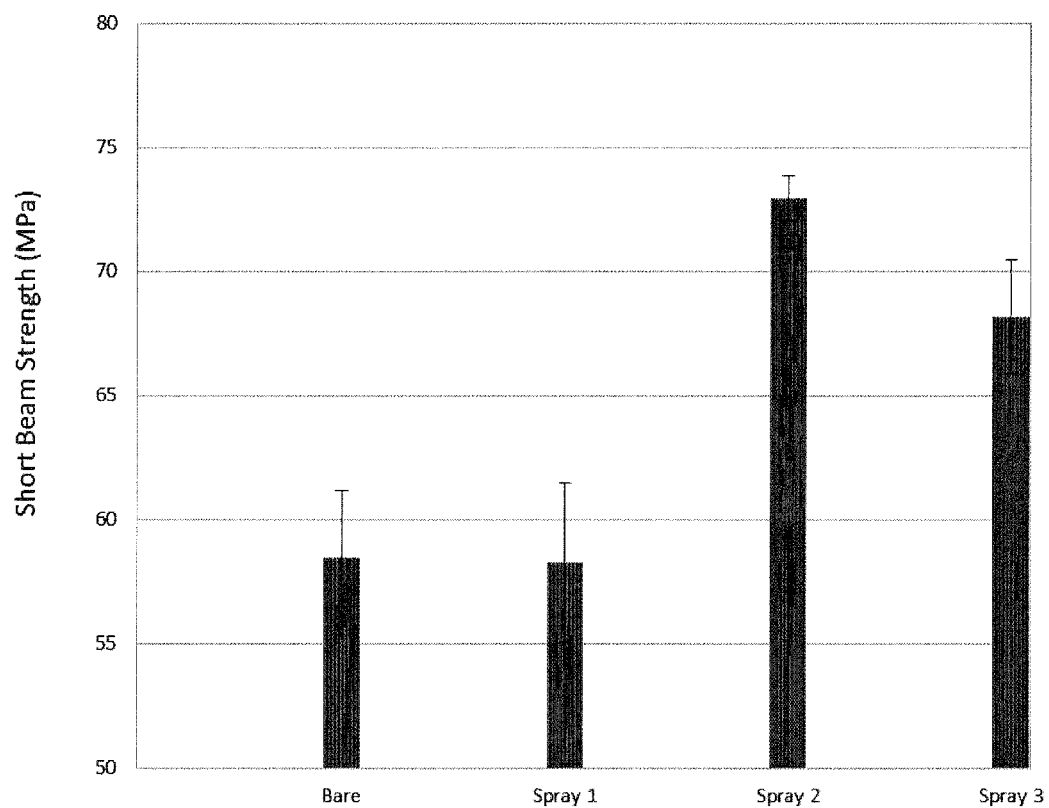
FIG. 14 is a bar graph of the short beam shear strength for laminar composites from S2-E773, according to embodiments of the invention, prepared from prepreg sheets that were spray coated with 3-5 µm long binding-agent-treated ZnO nanowires with a 100 psi cure pressure and 260° F. cure temperature for the indicated number of passes over the sheet's surface.
Figure 15:
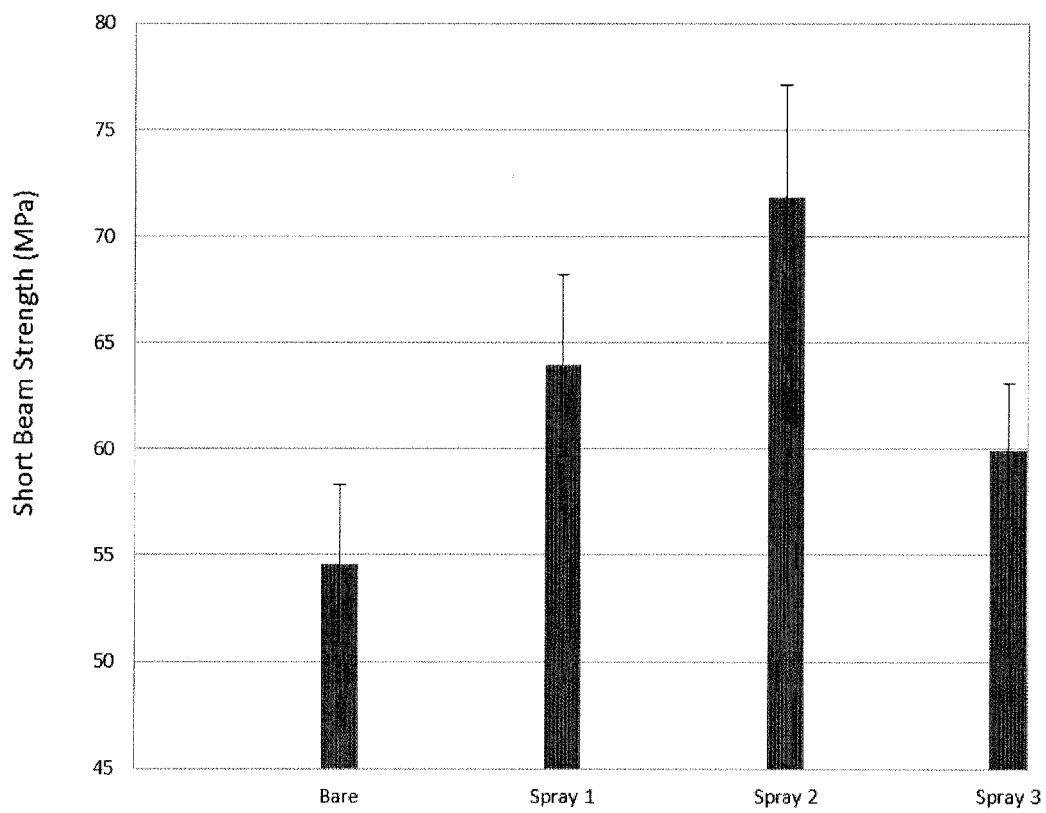
FIG. 15 is a bar graph of the short beam shear strength for laminar composites from S2-E773, according to embodiments of the invention, prepared from prepreg sheets that were spray coated with 1 µm long binding-agent-treated ZnO nanowires with a 100 psi cure pressure and 350° F. cure temperature for the indicated number of passes over the sheet's surface.
Figure 16:
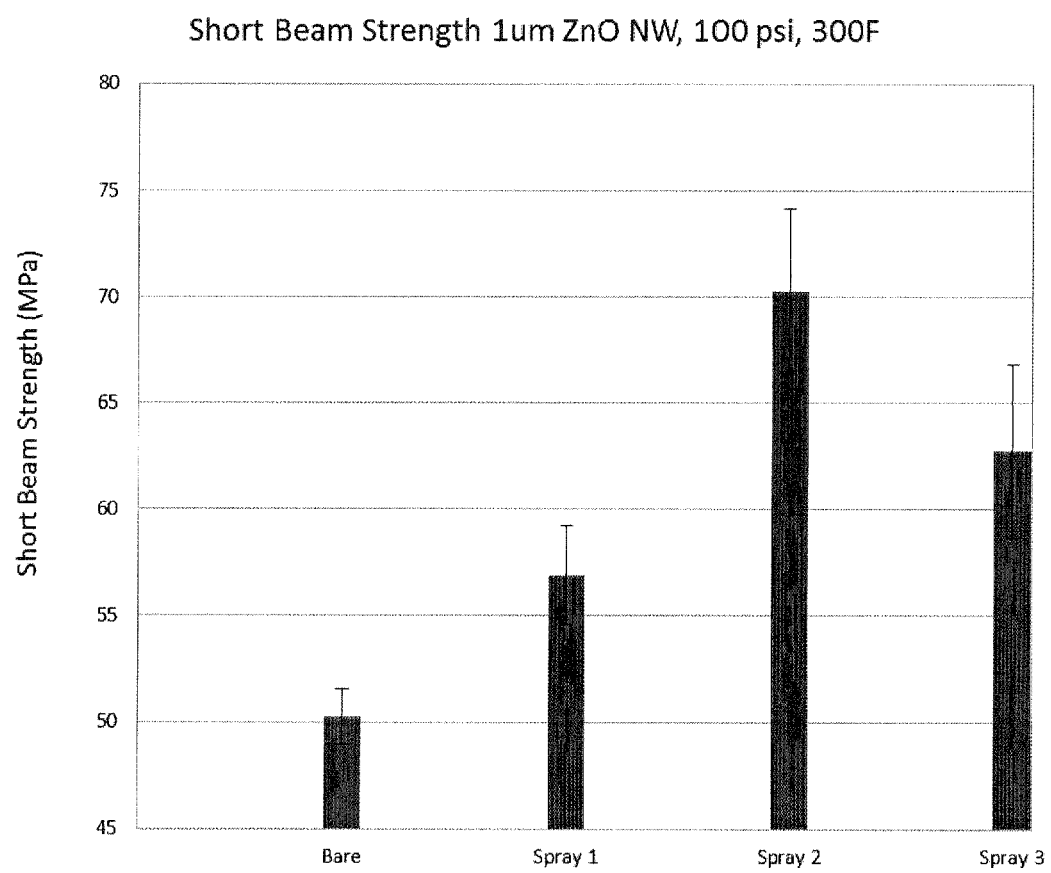
FIG. 16 is a bar graph of the short beam shear strength for laminar composites from S2-E773, according to embodiments of the invention, prepared from prepreg sheets that were spray coated with 1 µm long binding-agent-treated ZnO nanowires with a 100 psi cure pressure and 300° F. cure temperature for the indicated number of passes over the sheet's surface.

Tensile testing was performed to characterize in-plane properties of the laminar composites with binding-agent-treated ZnO nanowires deposited in the interlaminar regions. FIG. 9 shows the ultimate tensile strength (top) and tensile modulus (bottom) for composites formed incorporating binding-agent-treated 1 μm ZnO nanowires. None of these samples displayed a decrease of the in-plane properties, but some samples displayed an improvement of as much as 27.2% and 13.2% in the tensile strength and tensile modulus of the composites, respectively.

In similar manner, samples for short beam shear testing were prepared substituting Cytec S2-E773 prepreg with glass fibers for the CYCOM® 977-2 with carbon fibers, in the manner indicated above. Samples where 0-4 sprays of 300 nm, 1 μm, and 3-5 μm long nanowires were cured at 260° F. under pressures of 50, 100, and 200 psi. Samples with 0-4 sprays and 1 μm long nanowires were cured at 300° F. or 350° F. at 100 psi. The results of the testing are shown in FIGS. 10-16. Again the ZnO nanowires were shown to reinforce the interlaminar region of the composite, although with lower performance than the CYCOM® 977-2 prepreg, displaying an increase of up to 39.8% over untreated composites from S2-E773.

All patents, patent applications, provisional applications, and publications referred to or cited herein, supra or infra, are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

I claim:

1. A laminar composite, comprising at least one interlaminar reinforced interface comprising a dispersion of binding-agent-treated low-dimensional nanoparticles fixed between two adjacent lamina of a laminar composite by residues of the binding-agent-treated low-dimensional nanoparticles, wherein the binding-agent-treated low-dimensional nanoparticles comprise low-dimensional nanoparticles and binding agents that are small molecules, each of the binding agents comprising at least one functionality that binds to the low-dimensional nanoparticles and at least one functionality that binds to a matrix of the two adjacent lamina, wherein the low-dimensional nanoparticles are a metal, a metal alloy, a ceramic, or a glass and wherein the ceramic or the glass comprise a metal oxide, metal calcogenide, metal nitride, metal phosphide, metal arsenide, metal boride, metal silicide, or metal carbide.

2. The laminar composite of claim 1, wherein the low-dimensional nanoparticles comprise one-dimensional nanoparticles having a length to diameter ratio of three or greater and wherein the length is 300 nm to 10 μm.

3. The laminar composite of claim 2, wherein the low-dimensional nanoparticles comprise nanowires, nanofibers, nanotubes, nanoneedles, or nanobelts.

4. The laminar composite of claim 1, wherein the low-dimensional nanoparticles comprise two-dimensional nanoparticles having a cross-section to thickness ratio of three or greater and wherein the cross-section is 300 nm to 10 μm.

5. The laminar composite of claim 4, wherein the two-dimensional nanoparticles comprise nanoplates or nanodiscs.

6. The laminar composite of claim 1, wherein the metal oxide is ZnO.

7. The laminar composite of claim 1, wherein the binding agents is glycine and/or other amino acid.

8. The laminar composite of claim 1, wherein the functionality that binds to the low-dimensional nanoparticles is a carboxylic acid, a sulfonic acid, a sulfinic acid, a silane, a titanate, an amine, or a metal chelating ligand.

9. The laminar composite of claim 1, wherein the functionality that binds to the matrix is amino, hydroxy, thiol, carboxylic acid, ester, anhydride, vinyl, epoxy, isocyanate, or functional silane.

10. A method of forming a laminar composite according to claim 1, comprising:
   providing a plurality of prepreg sheets comprising a resin;
   depositing a solution or suspension comprising the binding-agent-treated low-dimensional nanoparticles in a liquid on at least one surface of at least one of the plurality of prepreg sheets to form a nanoparticle-comprising surface;
   optionally removing the liquid from the nanoparticle-comprising surface;
   laying-up the plurality of prepreg sheets;
   laminating the plurality of prepreg sheets under pressure to form an intimate interface between adjacent prepreg sheets; and
   curing the resin, wherein a laminar composite is formed where the interface between at least two lamina of the laminar composite is reinforced by the binding-agent-treated low-dimensional nanoparticles.

11. The method of claim 10, wherein the binding-agent-treated low-dimensional nanoparticles comprise ZnO nanowires treated with binding agents comprising glycine or other amino acid, and the liquid comprises methanol or other volatile solvent.

12. The method of claim 10, wherein depositing comprises spray coating, dip coating, or roller coating.

13. The method of claim 10, wherein removing the liquid comprises heating of the nanoparticle-comprising surface, passage of a gas through a volume situated adjacent to the nanoparticle-comprising surface, or evacuating a volume situated adjacent to the nanoparticle-comprising surface.

14. A method of forming a laminar composite according to claim 1, comprising:
   providing a plurality of prepreg sheets comprising a resin, wherein a plurality of the binding-agent-treated low-dimensional nanoparticles comprising the metal oxide and the plurality of the binding agents is dispersed within the plurality of prepreg sheets;
   laying-up the plurality of prepreg sheets;
   laminating the plurality of prepreg sheets under pressure to form an intimate interface between adjacent prepreg sheets; and curing the resin, wherein a laminar composite is formed where the intimate interface between at least two lamina of the laminar composite is reinforced by the binding-agent-treated low-dimensional nanoparticles.

15. The method of claim 14, wherein the metal oxide is ZnO.

* * * * *